US012574450B2

(12) United States Patent
Yu

(10) Patent No.: US 12,574,450 B2
(45) Date of Patent: Mar. 10, 2026

(54) HOUSING ASSEMBLY AND ELECTRONIC DEVICE

(71) Applicant: Beijing Xiaomi Mobile Software Co., Ltd., Beijing (CN)

(72) Inventor: Tao Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 615 days.

(21) Appl. No.: 17/935,847

(22) Filed: Sep. 27, 2022

(65) Prior Publication Data

US 2023/0403348 A1 Dec. 14, 2023

(30) Foreign Application Priority Data

Jun. 10, 2022 (CN) .......................... 202210658413.3

(51) Int. Cl.
H04M 1/02 (2006.01)
H01Q 1/24 (2006.01)

(52) U.S. Cl.
CPC ............ H04M 1/026 (2013.01); H01Q 1/243 (2013.01)

(58) Field of Classification Search
CPC .... H04M 1/026; H04M 1/0249; H04M 1/185; H04M 1/18; H01Q 1/243; H01Q 1/242; G06F 1/1656; G06F 1/1698; H05K 5/0217; H05K 5/04
See application file for complete search history.

(56) References Cited

U.S. PATENT DOCUMENTS

| | | | | |
|---|---|---|---|---|
| 9,854,694 | B2 * | 12/2017 | Kiple | C25D 11/12 |
| 10,321,590 | B2 * | 6/2019 | Cater | H01Q 1/24 |
| 10,433,442 | B2 * | 10/2019 | Merz | H05K 5/0247 |
| 10,477,675 | B1 * | 11/2019 | Kim | H05K 1/0219 |
| 2012/0112969 | A1 * | 5/2012 | Caballero | H01Q 1/243 |
| | | | | 343/702 |
| 2012/0176754 | A1 * | 7/2012 | Merz | H01Q 9/0421 |
| | | | | 361/751 |
| 2016/0056527 | A1 * | 2/2016 | Pascolini | H01Q 1/48 |
| | | | | 343/702 |

(Continued)

FOREIGN PATENT DOCUMENTS

CN 113451739 A 9/2021

OTHER PUBLICATIONS

Machine Translation of CN113451739, publication date: Sep. 28, 2021, Huawei Tech Co Ltd, Inventors: You et al., pp. 1-16 ( Year: 2021).*

(Continued)

*Primary Examiner* — Jinsong Hu
*Assistant Examiner* — Rui M Hu
(74) *Attorney, Agent, or Firm* — McCoy Russell LLP

(57) ABSTRACT

A housing assembly includes: a housing main body, including a partition slot; an antenna partition piece, connected to the housing main body and including a first partition portion filling the partition slot; and a reinforcing piece, connected to the antenna partition piece, where an angle is formed between an extension direction of the reinforcing piece and an extension direction of the partition slot, and a projection of the partition slot in a direction perpendicular to the extension direction of the reinforcing piece is at least partially located on the reinforcing piece.

16 Claims, 5 Drawing Sheets

(56) References Cited

U.S. PATENT DOCUMENTS

| | | | | |
|---|---|---|---|---|
| 2016/0192517 A1* | 6/2016 | Tsao | .................... | H04B 1/3888 |
| | | | | 361/679.01 |
| 2017/0054196 A1* | 2/2017 | Hu | ......................... | H01Q 1/243 |
| 2018/0166769 A1* | 6/2018 | Chang | ................... | H01Q 5/335 |
| 2019/0020102 A1* | 1/2019 | Jarvis | .................... | H01Q 1/521 |
| 2019/0036201 A1* | 1/2019 | Hill | .................... | H04M 1/0249 |
| 2019/0103657 A1* | 4/2019 | Wang | ................. | H04M 1/0249 |
| 2019/0327846 A1* | 10/2019 | Kiple | .................. | H05K 5/0243 |
| 2020/0076058 A1* | 3/2020 | Zhang | ..................... | H01Q 9/30 |
| 2020/0266524 A1* | 8/2020 | Yoon | ....................... | H01Q 1/48 |
| 2021/0037126 A1* | 2/2021 | Yoo | ...................... | H05K 5/0217 |
| 2021/0168225 A1* | 6/2021 | Bates | ................. | H05K 5/0086 |
| 2021/0408682 A1* | 12/2021 | Khripkov | .............. | H01Q 21/24 |
| 2022/0006176 A1* | 1/2022 | Froese | ................... | H01Q 1/243 |
| 2022/0173503 A1* | 6/2022 | Zhou | ....................... | H01Q 1/48 |
| 2024/0178570 A1* | 5/2024 | Liu | ........................ | H04M 1/02 |

OTHER PUBLICATIONS

European Patent Office, Extended European Search Report Issued in Application No. 22198473.5, May 23, 2023, Germany, 10 pages.

* cited by examiner

350(351)

341

342

120

131

132

140

4

110

HOUSING ASSEMBLY AND ELECTRONIC DEVICE

CROSS-REFERENCE TO RELATED APPLICATION

The present application claims priority to Chinese Patent Application No. 202210658413.3, filed on Jun. 10, 2022. The entire contents of the above-listed application are hereby incorporated by reference for all purposes.

BACKGROUND

In the related art, in order to meet the radio frequency requirements of the antenna, a partition slot needs to be reserved in a housing of a mobile phone with a metal housing.

SUMMARY

The disclosure relates to the technical field of electronic devices, and in particular, to a housing assembly and an electronic device.

According to a first aspect of the disclosure, a housing assembly is provided. The housing assembly includes: a housing main body, including a partition slot; an antenna partition piece, connected to the housing main body and including a first partition portion filling the partition slot; and a reinforcing piece, connected to the antenna partition piece, an angle being formed between an extension direction of the reinforcing piece and an extension direction of the partition slot, and a projection of the partition slot in a direction perpendicular to the extension direction of the reinforcing piece being at least partially located on the reinforcing piece.

According to a second aspect of the disclosure, an electronic device is provided and includes a housing assembly. The housing assembly includes: a housing main body, including a partition slot; an antenna partition piece, connected to the housing main body and including a first partition portion filling the partition slot; and a reinforcing piece, connected to the antenna partition piece, an angle being formed between an extension direction of the reinforcing piece and an extension direction of the partition slot, and a projection of the partition slot in a direction perpendicular to the extension direction of the reinforcing piece being at least partially located on the reinforcing piece.

BRIEF DESCRIPTION OF THE DRAWINGS

The accompanying drawings are used to provide a further understanding of the disclosure, and constitute a part of the description, and together with the following detailed description, are used to explain the disclosure, but not to limit the disclosure. In the drawings.

DETAILED DESCRIPTION

Figure 1:
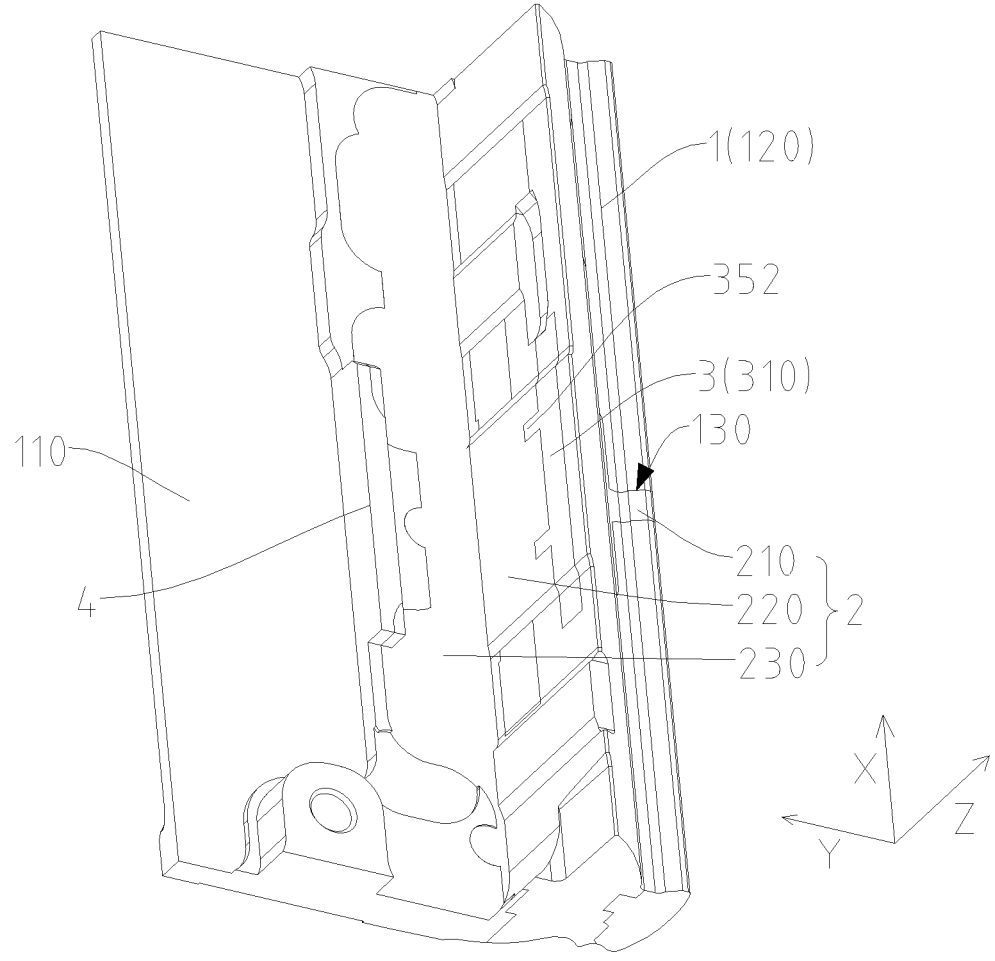
FIG. 1 is a partial structural schematic diagram of a housing assembly provided in an example of the disclosure, in which the assembly relationship among a housing main body, a reinforcing piece and an antenna partition piece is shown.

The specific examples of the disclosure will be described in detail below in conjunction with the accompanying drawings. It is to be understood that the specific examples described here are merely used to illustrate and explain the disclosure, but not to limit the disclosure.

In the disclosure, unless stated to the contrary, words such as "inner" and "outer" are used to refer to inside and outside of the contour of a component or structure. Furthermore, it is to be noted that terms such as "first" and "second" are used to distinguish one element from another, and have no order or importance. In addition, in the description with reference to the drawings, the same reference numerals in different drawings represent the same elements.

In the related art, in order to meet the radio frequency requirements of the antenna, a partition slot needs to be reserved in a housing of a mobile phone with a metal housing, and due to the implementation requirements of the antenna performance, the material filling the partition slot is usually a non-conductive plastic material, and for the mobile phone with a metal housing, the partition slot area is a weak area of strength in the mobile phone. In force tests such as three-bar bending, squeezing, dropping, and twisting, the problem of cracking of the plastic material in the partition area often occurs, which affects normal function of the mobile phone and the user experience.

The objective of the disclosure is to provide a housing assembly and an electronic device, and the housing assembly can enhance the strength of the partition slot region of a housing and reduce the phenomenon of stress concentration.

According to a first aspect of the disclosure, a housing assembly is provided. Referring to FIGS. 1 to 5, the housing assembly includes a housing main body 1, an antenna partition piece 2 and a reinforcing piece 3, the housing main body 1 is provided with a partition slot 130, the antenna partition piece 2 is connected to the housing main body 1 and is provided with a first partition portion 210 filling the partition slot 130, the reinforcing piece 3 is connected to the antenna partition piece 2, an angle is formed between the extension direction of the reinforcing piece 3 and the extension direction of the partition slot 130, and the projection of the partition slot 130 in the direction perpendicular to the extension direction of the reinforcing piece 3 is at least partially located on the reinforcing piece 3.

Through the above technical solution, that is, the reinforcing piece 3 is arranged on the antenna partition piece 2, an angle is formed between the extension direction of the reinforcing piece 3 and the extension direction of the partition slot 130, and the projection of the partition slot 130 in the direction perpendicular to the extension direction of the reinforcing piece 3 is at least partially located on the reinforcing piece 3, that is, it can also be understood that the reinforcing piece 3 spans the partition slot 130 in a width direction of the partition slot 130, the structural strength of the partition slot area of the housing main body 1 can be strengthened and the phenomenon of stress concentration can be reduced, so that it is possible to reduce or even avoid the phenomenon that the partition slot area of the housing main body is prone to local deformation, which can improve the product yield and improve the user experience.

Figure 2:
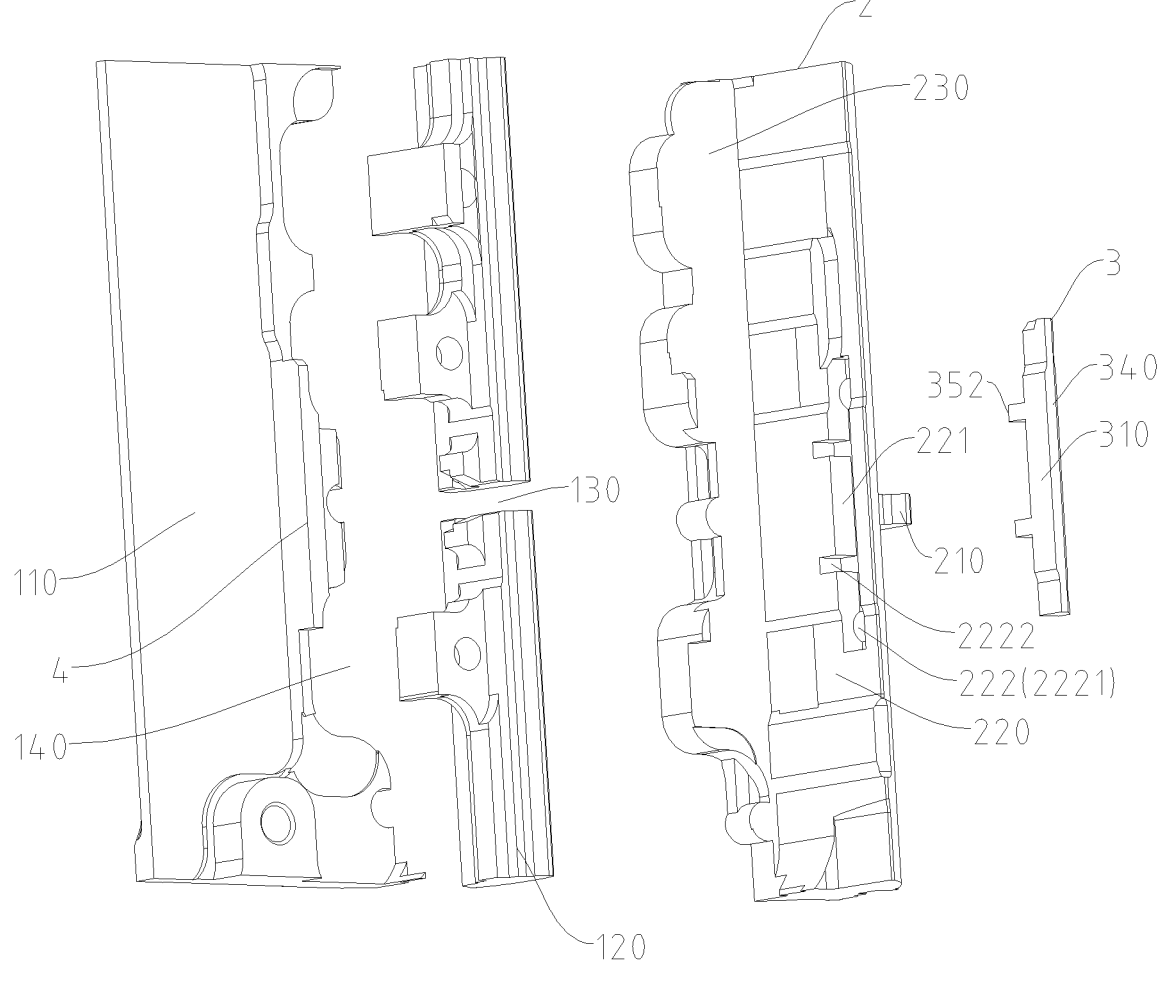
FIG. 2 is an exploded view of a partial structure of the housing assembly in FIG. 1.

In some examples, referring to FIGS. 1 and 2, the housing main body 1 includes a bottom plate 110 and a side plate 120 arranged around an edge of the bottom plate 110, the side plate 120 is provided with a notch forming the partition slot 130, the bottom plate 110 is provided with a clearance area 140 communicating with the partition slot 130, the antenna partition piece 2 includes a second partition portion 220 connected to the side plate 120 and the first partition portion 210, and a third partition portion 230 filling the clearance area 140, and the reinforcing piece 3 is on the second partition portion 220 and/or the third partition portion 230. With such an arrangement manner of the reinforcing piece 3, the structural strength of the partition slot region on the side plate 120 can be enhanced, and the situation that the side plate parts on two sides of the partition slot 130 are deformed to be separated from the first partition portion 210 is avoided, so that the product yield and the user experience can be improved.

The clearance area 140 may be formed by a through hole formed in the bottom plate 110, and mainly plays a role in providing a clearance for the antenna to ensure the performance of the antenna. The metal parts, located on two sides of the partition slot 130, of the side plate 120 generally have an antenna function and need to maintain a certain degree of isolation.

In addition, the antenna partition piece 2 may fill the clearance area 140 of the bottom plate 110 with the third partition portion 230, connect the second partition portion 220 to the inner wall face of the side plate 120 as well as the reinforcing piece 3, and filling the partition slot 130 with the first partition portion 210 by a nano-injection molding process, so as to significantly enhance the bonding strength among the housing main body 1, the antenna partition piece 2 and the reinforcing piece 3, to significantly improve the strength of the partition slot area and reduce the phenomenon of stress concentration, so as to improve the product yield and the user experience.

The housing assembly may be applied to an electronic device, the electronic device may be, for example, a mobile phone, a tablet computer, or the like. Taking an electronic device being a mobile phone as an example, in one application scenario, the housing assembly may serve as a middle frame of the mobile phone, for example, one side of the bottom plate 110 of the housing main body 1 may be used to be provided with, for example, a display screen assembly, i.e., a mobile phone display screen, and the other side of the bottom plate 110 may be provided with a back cover to form an inner cavity between the bottom plate 110 and the back cover, and electronic components such as a mainboard, a battery, a microphone, a speaker and an antenna module may be arranged in the inner cavity, which are not specifically limited in the disclosure. In another application scenario, the housing assembly may also be used as a casing of the mobile phone, that is, it can be understood that a side frame and a back cover of the mobile phone can be constructed as one piece, in which case the side plate 120 is the side frame of the mobile phone casing, the bottom plate 110 is the back cover, and the side frame and the back cover define the above-mentioned inner cavity for containing the electronic components. Further, in yet another scenario, the side plate 120 may be a side frame of a mobile phone and the bottom plate 110 is a front housing of the mobile phone. It is to be understood that after reading the technical solution of the disclosure, those skilled in the art can apparently understand the technical solution when the electronic device is other products.

For ease of description, an XYZ coordinate system is established for the housing assembly, in which the X direction refers to the width direction of the partition slot 130; the Z direction refers to the extension direction of the partition slot 130, and may also refer to the width direction of the side plate 120 of the housing main body 1, or refer to the thickness direction of a mobile phone or tablet computer when the housing assembly is applied to an electronic device such as a mobile phone or a tablet computer; the Y direction is perpendicular to the X direction and the Z direction and may refer to, for example, the width direction or the length direction of a mobile phone or tablet computer.

FIGS. 1 and 2 show an example in which the reinforcing piece 3 is arranged on the side plate 120 by way of example, in this example, an angle is formed between the extension direction of the reinforcing piece 3 and the extension direction of the partition slot 130, for example, the extension direction of the reinforcing piece 3 may be perpendicular to the extension direction of the partition slot 130. The extension direction of the reinforcing piece 3 may refer to the X direction in FIG. 1, i.e., the width direction of the partition slot 130, and by such an arrangement manner, the structural strength of the partition slot area can be further enhanced to prevent deformation of the partition slot area. Certainly, any other suitable angle may be formed between the extension direction of the reinforcing piece 3 and the extension direction of the partition slot 130, which are not specifically limited in the disclosure.

The housing main body 1 may be, for example, made of high-strength aluminum alloy, and the high-strength aluminum alloy refers to aluminum alloy whose tensile strength is greater than 480 MPa, which mainly includes alloys based on Al—Cu—Mg and Al—Zn—Mg—Cu, i.e. alloys of the 2XXX (hard aluminum alloy type) and 7XXX (ultra-hard aluminum alloy type) series. In addition, the housing main body 1 may also be made of materials such as magnesium alloy, stainless steel and titanium alloy, which are not specifically limited in the disclosure.

The reinforcing piece 3 may be made of any suitable material according to the requirements of the actual application, for example, the reinforcing piece 3 may be a metal piece, i.e., the reinforcing piece 3 may be made of a metal material, for example, the reinforcing piece 3 may be made of an aluminum alloy material, such as a new type of high-strength aluminum alloy, having better tensile strength and capable of significantly increasing the strength of the partition slot region of the housing main body 1. In addition, the reinforcing piece 3 may also be made of a material such as magnesium alloy, stainless steel and titanium alloy, which are not specifically limited in the disclosure. In addition, the reinforcing piece 3 may also be made of a non-metallic material having high strength, such as a polymer material, which can also improve the strength of the partition slot region of the housing main body 1.

When the reinforcing piece 3 is a metal piece, the reinforcing piece 3 is spaced from the housing main body 1 such that a certain clearance distance is maintained between the reinforcing piece 3 and the housing main body 1 to ensure the good performance of the antenna.

For example, the shortest distance between the reinforcing piece 3 and the housing main body 1 is greater than 0.9 mm, i.e., the shortest distance between the reinforcing piece 3 and the side plate 120 or the bottom plate 110 is greater than 0.9 mm, so as to further enable the clearance distance between the reinforcing piece 3 and the housing main body 1 to be the most appropriate to ensure the good performance of the antenna.

Figure 3:
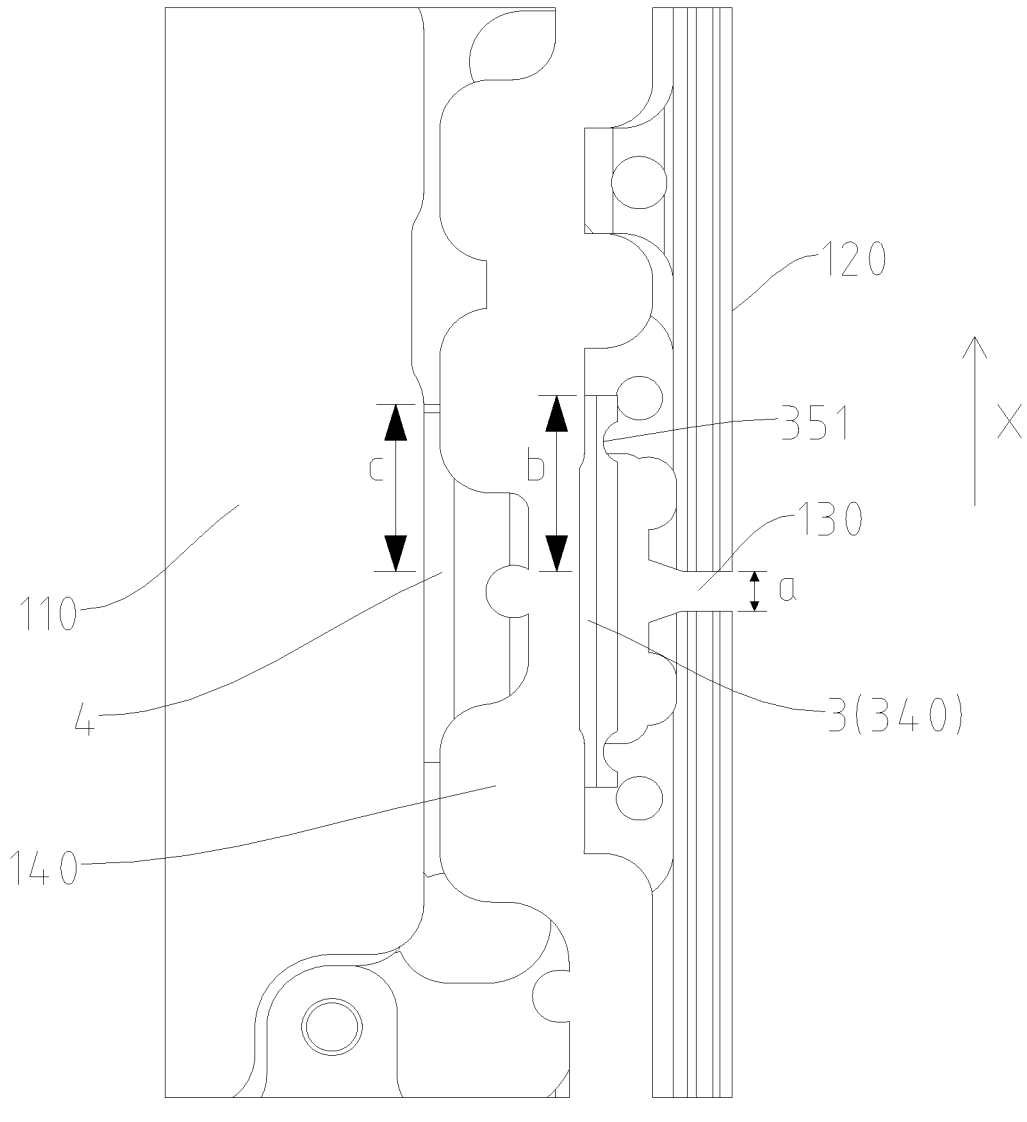
FIG. 3 is a top view of the housing assembly in FIG. 1 with the antenna partition piece removed.

Referring to FIG. 3, the shortest distance b between any one of two ends of the reinforcing piece 3 and the partition slot 130 in the width direction of the partition slot 130 is not less than 4 mm to ensure the good reinforcing effect and improve the strength of the partition slot region of the housing main body 1. For example, in some examples, referring to FIG. 3, if the width a of the partition slot 130 is 0.9 mm, then the minimum length of the reinforcing piece 3 in the width direction of the partition slot 130 (X direction) may be no less than 0.9 mm+4 mm+4 mm=4.9 mm.

In some examples, referring to FIGS. 1 and 2, the second partition portion 220 and/or the third partition portion 230 is provided with a recessed accommodating groove 221, and the reinforcing piece 3 is at least partially arranged in the recessed accommodating groove 221. In this way, the reinforcing piece 3 is arranged in the recessed accommodating groove 221, so that the inner space of the whole device occupied by the reinforcing piece 3 can be reduced, or even the reinforcing piece 3 can be prevented from occupying the inner space of the whole device, and the strength of connection between the reinforcing piece 3 and the antenna partition piece 2 can be improved.

In some examples, referring to FIG. 1, the second partition portion 220 is tightly connected to the inner wall face of the side plate 120, the recessed accommodating groove 221 is on an inner surface of the second partition portion 220 facing away from the side plate 120, and a first side face 310 of the reinforcing piece 3, which is located on a same side as an opening of the recessed accommodating groove 221, is recessed within or flush with the inner surface of the second partition portion 220, i.e., the reinforcing piece 3 is fully embedded into the recessed accommodating groove 221, so as to prevent the reinforcing piece 3 from occupying the inner space of the whole device. In addition, the first side face 310 being flush with the outer surface of the second partition portion 220 may be understood as having the meaning that the first side face 310 has a shape matched with the shape of the outer surface of the second partition portion 220 to prevent the first side face 310 from protruding from the outer surface to occupy the inner space of the whole device.

The reinforcing piece 3 may be connected to the second partition portion 220 of the antenna partition piece 2 in any suitable manner, for example, the reinforcing piece 3 may be connected to the second partition portion 220 by way of snap-fitting or interference fit or bonding. In some examples, such as when the reinforcing piece 3 is a metal piece, the second partition portion 220 may be connected to the reinforcing piece 3 by a nano-injection molding process. For example, in the processing process, the reinforcing piece 3 is first processed in place (there will be continuous material support), then nano-sized pores are formed in the surface of the reinforcing piece 3 by an electrochemical method, then the plastic material is injection-molded in place, molten plastic will permeate into the nano-sized holes to form a relatively strong bonding force, then excess material features are processed in place by CNC, and the plastic part forms the antenna partition piece 2. By the nano-injection molding process, the bonding force and bonding strength of the reinforcing piece 3 and the second partition portion 220 can be significantly increased, and the strength of the partition slot area can be further improved.

In some examples, referring to FIGS. 1 to 5, the reinforcing piece 3 is provided with a first connecting portion 350, and a first matching portion 222 in matched connection with the first connecting portion 350 is arranged in the recessed accommodating groove 221. The first connecting portion 350 may be constructed, for example, as a protrusion or groove or connecting face, the connection face may be a plane or special-shaped face, the first matching portion 222 is a structure matched with the first connecting portion 350, and can enhance the contact area between the reinforcing piece 3 and the second partition portion 220 when the first connecting portion 350 is constructed as a protrusion or groove or special-shaped face, and the strength of connection between the reinforcing piece 3 and the second partition portion 220 can be enhanced when the connection mode such as nano-injection molding or bonding is adopted.

In some examples, referring to FIGS. 1, 2, 4 and 5, the reinforcing piece 3 has a first side face 310 located on the same side as the opening of the recessed accommodating groove 221, and a second side face 320 opposite to the first side face 310, the first connecting portion 350 includes a first protrusion (not shown in the figure) and/or a first groove 351 arranged on the second side face 320, the first matching portion 222 includes a second groove (not shown in the figure) matched with the first protrusion and/or a second protrusion 2221 matched with the first groove 351, and at least two of the first protrusions or at least two of the first grooves 351 are provided and are respectively located on two opposite sides of the partition slot 130 in the width direction of the partition slot 130. FIGS. 1-5 show an example in which the second side face 320 is provided with two first grooves 351 and the second partition portion 220 is provided with two second protrusions 2221, and by arranging the two first grooves 351 on two opposite sides of the partition slot 130 in the width direction (X-direction), the effect of stretching can be achieved, that is, the structural strength of the partition slot area can be improved. When the reinforcing piece 3 is connected to the second partition portion 220 using a nano-injection molding process, such an arrangement manner can enhance the bonding force between the metal part (reinforcing piece 3) and the plastic part (antenna partition piece 2), increase the overall mechanical strength effect, and make the metal part and the plastic part more difficult to separate under the action of an external force.

Figure 4:
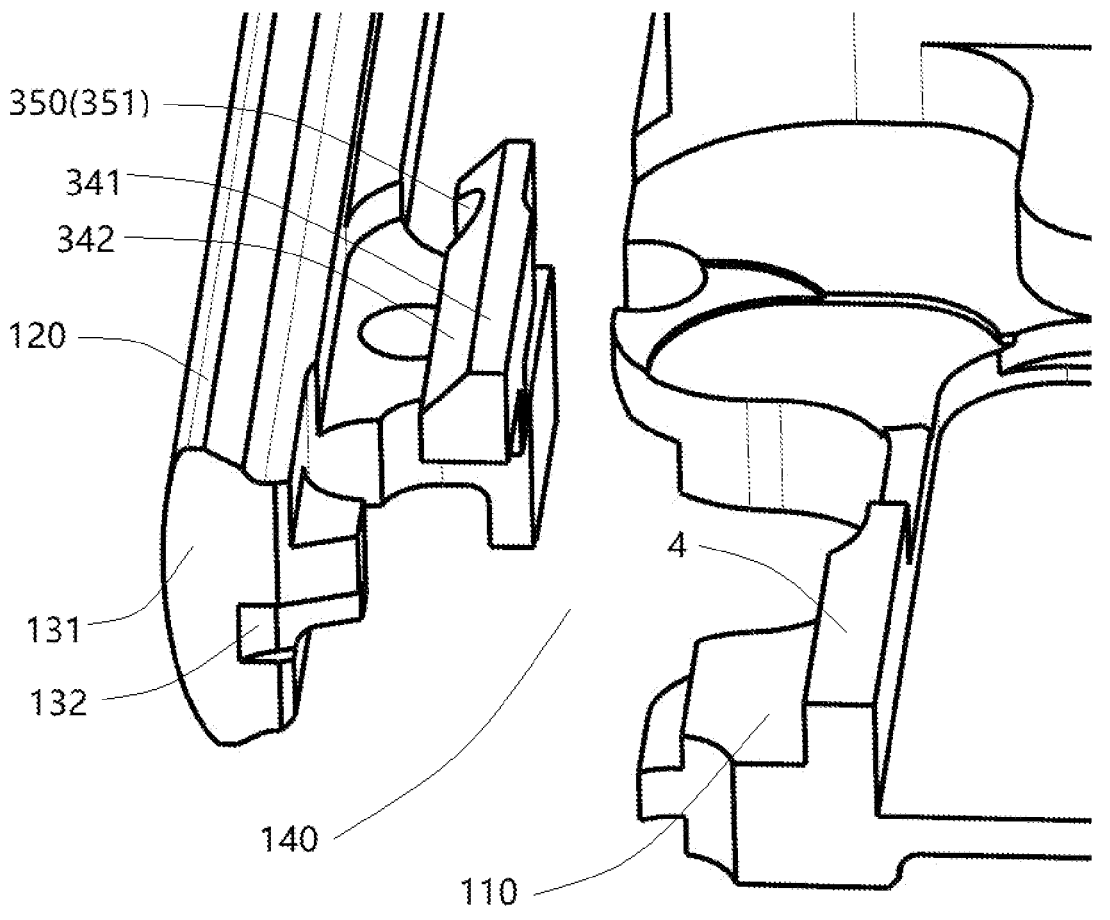
FIG. 4 is a partial cross-sectional view of a partial structure of the housing assembly in FIG. 1 with the antenna partition piece removed.
Figure 5:
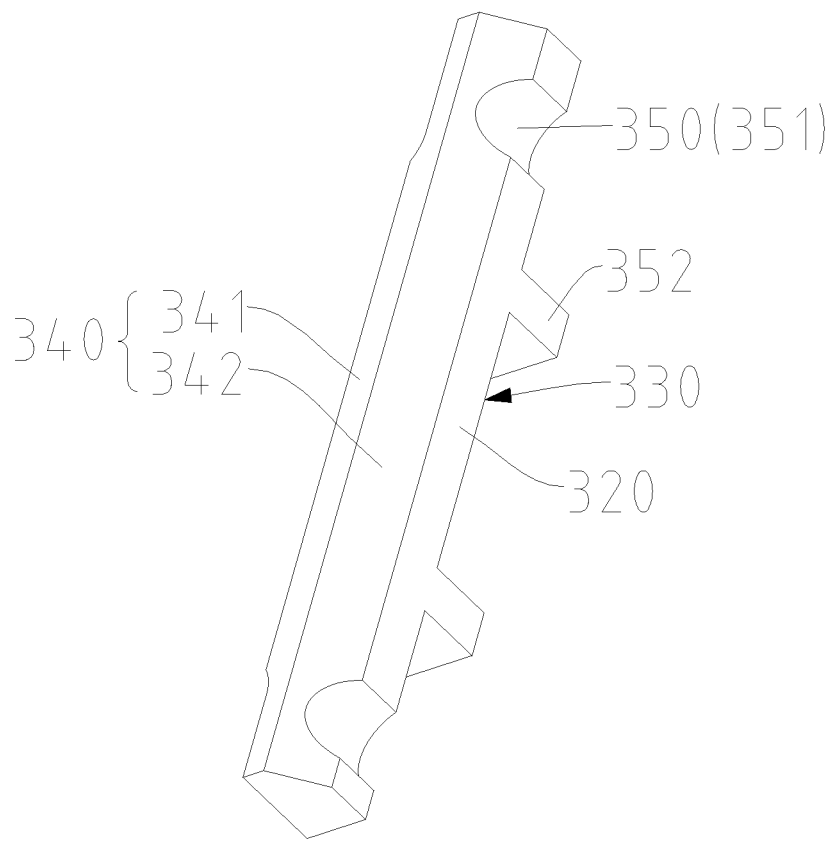
FIG. 5 is a structural schematic diagram of a reinforcing piece provided in an example of the disclosure.

In some examples, referring to FIGS. 1, 2 and 5, the reinforcing piece 3 has a third side face 330 and a fourth side face 340 which are located between the first side face 310 and the second side face 320 and are opposite to each other, the first connecting portion 350 includes a third protrusion 352 and/or a third groove (not shown in the figure) arranged on the third side face 330 and/or the fourth side face 340, the first matching portion 222 includes a fourth groove 2222 matched with the third protrusion 352 and/or a fourth protrusion (not shown in the figure) matched with the third groove, and at least two of the third protrusions 352 or at least two of the third grooves are provided and are respectively located on two opposite sides of the partition slot 130 in the width direction of the partition slot 130. FIGS. 1-5 show an example in which the third side face 330 is provided with two third protrusions 352 and the second partition portion 220 is provided with two fourth grooves 2222, and similarly, by arranging the two third protrusions 352 on two opposite sides of the partition slot 130 in the width direction (X-direction), the structural strength of the partition slot area can be improved. When the reinforcing piece 3 is connected to the second partition portion 220 using a nano-injection molding process, such an arrangement manner can enhance the bonding force between the metal part (reinforcing piece 3) and the plastic part (antenna partition piece 2), increase the overall mechanical strength effect, and make the metal part and the plastic part more difficult to separate under the action of an external force.

In some examples, referring to FIGS. 4 and 5, the reinforcing piece 3 has a first side face 310 located on the same side as the opening of the recessed accommodating groove 221, a second side face 320 opposite to the first side face 310, and a third side face 330 and a fourth side face 340 which are located between the first side face 310 and the second side face 320 and are opposite to each other, at least one of the third side face 330 and the fourth side face 340 includes a first surface 341 and a second surface 342 which are connected from the first side face 310 to the second side face 320. The second surface 342 extends obliquely inwards from the first surface 341 toward the second side face 320. Through this arrangement manner, when the reinforcing piece 3 and the recessed accommodating groove 221 are connected by using the nano-injection molding process, it is convenient for the reinforcing piece 3 and the recessed accommodating groove 221 to be fully bonded, and the bonding effect is enhanced. When the reinforcing piece 3 and the recessed accommodating groove 221 are connected by manners such as bonding or snap-fitting, installing is convenient.

In some examples, one or more reinforcing pieces 3 may be provided, and a plurality of reinforcing pieces 3 are arranged side-by-side and at intervals to further enhance the strength of the partition slot area.

In some examples, referring to FIG. 4, the partition slot 130 has two opposite side wall faces 131 in the width direction, at least one of the two side wall faces 131 is provided with at least one fifth protrusion (not shown in the figure) and/or at least one fifth groove 132, and the first partition portion 210 is provided with a sixth groove (not shown in the figure) matched with the fifth protrusion and/or a sixth protrusion (not shown in the figure) matched with the fifth groove 132. In this example, the first partition portion 210 is connected to the partition slot 130 by a nano-injection molding process, which can not only improve the strength of connection between the first partition portion 210 and the partition slot 130, but also achieve the effect of waterproof sealing. On this basis, through matching of the protrusions and grooves, the contact area between the partition slot 130 and the first partition portion 210 is increased, and the strength of bonding between the metal housing main body and the plastic part (antenna partition piece 2) can be further increased so as to increase the overall strength of the partition area. FIG. 4 shows an example in which one fifth groove 132 is arranged on the partition slot 130 by way of example to improve the strength of bonding between the housing main body 1 and the antenna partition piece 2.

In some examples, referring to FIGS. 1 to 4, the bottom plate 110 is provided with at least one reinforcing rib 4, an angle is formed between the extension direction of the reinforcing rib 4 and the extension direction of the partition slot 130, and the projection of the partition slot 130 in the direction perpendicular to the extension direction of the reinforcing rib 4 is at least partially located on the reinforcing rib 4, that is, the reinforcing rib 4 spans the partition slot 130 in the width direction of the partition slot 130, so that the structural strength of the partition slot area of the housing main body 1 can be further strengthened and the phenomenon of stress concentration can be reduced. When a plurality of reinforcing ribs 4 are provided, the plurality of reinforcing ribs 4 may be arranged side-by-side and at intervals to further enhance the structural strength.

The reinforcing rib 4 may be made of any suitable material, for example, in some examples, the reinforcing rib 4 may be a metal reinforcing rib integrated with the bottom plate 110 and located on the side opposite to the side of the clearance area 140 communicating with the partition slot 130; the reinforcing rib 4 may be made of the same metal material as the bottom plate 110, for example, aluminum alloy, magnesium alloy, stainless steel, titanium alloy, or the like, which are not specifically limited in the disclosure. The reinforcing rib 4 is arranged on the side opposite to the side of the clearance area 140 communicating with the partition slot 130, so that not only is the arrangement of the reinforcing rib 4 facilitated, but also interference with the performance of the antenna can be avoided by the clearance area 140 when the reinforcing rib 4 is made of a metal material.

In some other examples, the reinforcing rib 4 may also be a non-metallic piece connected to the bottom plate 110 by a nano-injection molding process, and the non-metallic piece may be made of any suitable material depending on the requirements of the actual application, for example, a high-strength non-metallic material such as a polymer material may be adopted, which are not specifically limited in the disclosure.

In order to improve the degree of reinforcing of the reinforcing rib 4 to the partition slot area, in some examples, referring to FIG. 3, the shortest distance c between any one of two ends of the reinforcing rib 4 and the partition slot 130 in the width direction of the partition slot 130 is no less than 4 mm. For example, in some examples, referring to FIG. 3, if the width a of the partition slot 130 is 0.9 mm, then the minimum length of the reinforcing rib 4 in the width direction of the partition slot 130 (X direction) may be no less than 0.9 mm+4 mm+4 mm=4.9 mm.

According to a second aspect of the disclosure, an electronic device is provided and includes the above-described housing assembly, and the electronic device may be, for example, a mobile phone or a tablet computer or the like, and has all the beneficial effects of the above-described housing assembly, which will not be repeated here in the disclosure.

Certain examples of the disclosure have been described above in detail with reference to the accompanying drawings, but the disclosure is not limited to specific details in the above-described examples, and many simple modifications may be made to the technical solutions of the disclosure within the technical idea of the disclosure, all of which are within the scope of protection of the disclosure.

It is furthermore to be noted that various specific technical features described in the above specific examples may be combined in any suitable manner under the circumstance that there is no contradiction. In order to avoid needless repetition, the disclosure does not further describe the various possible combinations.

In addition, the various examples of the disclosure may also be combined arbitrarily, and as long as they do not violate the spirit of the disclosure, they should also be regarded as the content disclosed in the disclosure.

Additional non-limiting embodiments of the disclosure include:

1. A housing assembly, including: a housing main body, including a partition slot; an antenna partition piece, connected to the housing main body and including a first partition portion filling the partition slot; and a reinforcing piece, connected to the antenna partition piece, an angle being formed between an extension direction of the reinforcing piece and an extension direction of the partition slot, and a projection of the partition slot in a direction perpendicular to the extension direction of the reinforcing piece being at least partially located on the reinforcing piece.

2. The housing assembly of embodiment 1, where the housing main body includes a bottom plate and a side plate arranged around an edge of the bottom plate, the side plate includes a notch forming the partition slot, the bottom plate includes a clearance area communicating with the partition slot, the antenna partition piece includes a second partition portion connected to the side plate and the first partition portion, and a third partition portion filling the clearance area, and at least one of the second partition portion and the third partition portion is provided with the reinforcing piece.

3. The housing assembly of embodiment 2, where at least one of the second partition portion and the third partition portion includes a recessed accommodating groove, and the reinforcing piece is at least partially located in the recessed accommodating groove.

4. The housing assembly of embodiment 3, where the second partition portion is tightly connected to an inner wall face of the side plate, the recessed accommodating groove is on an inner surface of the second partition portion facing away from the side plate, and a first side face of the reinforcing piece, which is located on a same side as an opening of the recessed accommodating groove, is recessed within or flush with the inner surface of the second partition portion.

5. The housing assembly of embodiments 3 or 4, where the reinforcing piece includes a first connecting portion, and a first matching portion in matched connection with the first connecting portion is located in the recessed accommodating groove.

6. The housing assembly of embodiment 5, where the reinforcing piece includes a first side face located on a same side as an opening of the recessed accommodating groove, and a second side face opposite to the first side face, the first connecting portion includes a first protrusion and/or a first groove arranged on the second side face, the first matching portion includes a second groove matched with the first protrusion and/or a second protrusion matched with the first groove, and at least two of the first protrusions or at least two of the first grooves are respectively located on two opposite sides of the partition slot in a width direction of the partition slot, and/or, the reinforcing piece includes a third side face and a fourth side face which are located between the first side face and the second side face and are opposite to each other, the first connecting portion includes a third protrusion and/or a third groove arranged on the third side face and/or the fourth side face, the first matching portion includes a fourth groove matched with the third protrusion and/or a fourth protrusion matched with the third groove, and at least two of the third protrusions or at least two of the third grooves are respectively located on two opposite sides of the partition slot in the width direction of the partition slot.

7. The housing assembly of any one of embodiments 3 to 6, where the reinforcing piece includes a first side face located on a same side as an opening of the recessed accommodating groove, and a second side face opposite to the first side face, as well as a third side face and a fourth side face which are located between the first side face and the second side face and are opposite to each other, at least one of the third side face and the fourth side face includes a first surface and a second surface which are connected in sequence from the first side face towards the second side face, and the second surface extends obliquely inwards from the first surface towards the second side face.

8. The housing assembly of any one of embodiments 1 to 7, where a shortest distance between any one of two ends of the reinforcing piece and the partition slot in a width direction of the partition slot is not less than 4 mm.

9. The housing assembly of any one of embodiments 1 to 8, where the housing main body is made of high-strength aluminum alloy, and/or the reinforcing piece is a metal piece.

10. The housing assembly of embodiment 9, where the antenna partition piece is connected to the reinforcing piece by a nano-injection molding process.

11. The housing assembly of embodiments 9 or 10, where the reinforcing piece is spaced from the housing main body.

12. The housing assembly of embodiment 11, where the shortest distance between the reinforcing piece and the housing main body is greater than 0.9 mm.

13. The housing assembly of any one of embodiments 1 to 12, where the housing assembly includes one or more of the reinforcing piece, and a plurality of the reinforcing pieces are arranged side-by-side and at intervals.

14. The housing assembly of any one of embodiments 1 to 13, where the partition slot includes two opposite side wall faces in a width direction of the partition slot, at least one of the two opposite side wall faces has at least one fifth protrusion and/or at least one fifth groove, the first partition portion includes a sixth groove matched with the fifth protrusion and/or a sixth protrusion matched with the fifth groove, and the first partition portion is connected to the partition slot by a nano-injection molding process.

15. The housing assembly of any one of embodiments 1 to 14, where the housing main body includes a bottom plate and a side plate arranged around an edge of the bottom plate, the side plate includes a notch forming the partition slot, the bottom plate includes a clearance area communicating with the partition slot, the bottom plate is provided with at least one reinforcing rib, an angle is formed between an extension direction of the reinforcing rib and the extension direction of the partition slot, and a projection of the partition slot in a direction perpendicular to the extension direction of the reinforcing rib is at least partially located on the reinforcing rib.

16. The housing assembly of embodiment 15, where the reinforcing rib is a metal reinforcing rib integrated with the bottom plate, and the metal reinforcing rib is located on a side opposite to the side of the clearance area communicating with the partition slot; or, the reinforcing rib is a non-metallic piece connected to the bottom plate by a nano-injection molding process.

17. The housing assembly of embodiments 15 or 16, where a shortest distance between any one of two ends of the reinforcing rib and the partition slot in a width direction of the partition slot is no less than 4 mm.

18. An electronic device, including the housing assembly of any one of embodiments 1 to 17.

The invention claimed is:

1. A housing assembly, comprising:

a housing main body, comprising a partition slot;

an antenna partition piece, connected to the housing main body and comprising a first partition portion filling the partition slot; and a reinforcing piece, connected to the antenna partition piece, wherein an angle is formed between an extension direction of the reinforcing piece and an extension direction of the partition slot, and a projection of the partition slot in a direction perpendicular to the extension direction of the reinforcing piece is at least partially located on the reinforcing piece;

wherein the antenna partition piece comprises a second partition portion and a third partition portion, and at least one of the second partition portion and the third partition portion is provided with the reinforcing piece;

wherein at least one of the second partition portion and the third partition portion comprises a recessed accommodating groove, and the reinforcing piece is at least partially located in the recessed accommodating groove;

wherein the reinforcing piece comprises a first connecting portion, and a first matching portion in matched connection with the first connecting portion is located in the recessed accommodating groove;

wherein the reinforcing piece comprises a first side face located on a same side as an opening of the recessed accommodating groove, and a second side face opposite to the first side face, the first connecting portion comprises a first groove arranged on the second side face, the first matching portion comprises a second protrusion matched with the first groove, and at least two of the first grooves are respectively located on two opposite sides of the partition slot in a width direction of the partition slot; and the reinforcing piece comprises a third side face and a fourth side face which are located between the first side face and the second side face and are opposite to each other, the first connecting portion comprises a third protrusion arranged on the third side face, the first matching portion comprises a fourth groove matched with the third protrusion, and at least two of the third protrusions are respectively located on two opposite sides of the partition slot in the width direction of the partition slot.

2. The housing assembly according to claim 1, wherein the housing main body comprises a bottom plate and a side plate arranged around an edge of the bottom plate, wherein the side plate comprises a notch forming the partition slot, the bottom plate comprises a clearance area communicating with the partition slot, the second partition portion connected to the side plate and the first partition portion, and the third partition portion filling the clearance area.

3. The housing assembly according to claim 1, wherein the second partition portion is tightly connected to an inner wall face of the side plate, the recessed accommodating groove is on an inner surface of the second partition portion facing away from the side plate, and a first side face of the reinforcing piece, which is located on a same side as an opening of the recessed accommodating groove, is recessed within or flush with the inner surface of the second partition portion.

4. The housing assembly according to claim 1, wherein the reinforcing piece comprises a first side face located on a same side as an opening of the recessed accommodating groove, and a second side face opposite to the first side face, as well as a third side face and a fourth side face which are located between the first side face and the second side face and are opposite to each other, at least one of the third side face and the fourth side face comprises a first surface and a second surface which are connected in sequence from the first side face towards the second side face, and the second surface extends obliquely inwards from the first surface towards the second side face.

5. The housing assembly according to claim 1, wherein a shortest distance between any one of two ends of the reinforcing piece and the partition slot in a width direction of the partition slot is not less than 4 mm.

6. The housing assembly according to claim 1, wherein the housing main body is made of high-strength aluminum alloy, and the reinforcing piece is a metal piece; the reinforcing piece is spaced from the housing main body.

7. The housing assembly according to claim 1, wherein the housing assembly comprises one or more of the reinforcing piece, and a plurality of the reinforcing pieces are arranged side-by-side and at intervals.

8. The housing assembly according to claim 1, wherein the partition slot comprises two opposite side wall faces in a width direction of the partition slot, at least one of the two opposite side wall faces has at least one fifth groove, the first partition portion comprises a sixth protrusion matched with the fifth groove.

9. The housing assembly according to claim 1, wherein the housing main body comprises a bottom plate and a side plate arranged around an edge of the bottom plate, wherein the side plate comprises a notch forming the partition slot, the bottom plate comprises a clearance area communicating with the partition slot, the bottom plate is provided with at least one reinforcing rib, an angle is formed between an extension direction of the reinforcing rib and the extension direction of the partition slot, and a projection of the partition slot in a direction perpendicular to the extension direction of the reinforcing rib is at least partially located on the reinforcing rib.

10. The housing assembly according to claim 9, wherein the reinforcing rib is a metal reinforcing rib integrated with the bottom plate, and the metal reinforcing rib is located on a side opposite to the side of the clearance area communicating with the partition slot.

11. The housing assembly according to claim 9, wherein a shortest distance between any one of two ends of the reinforcing rib and the partition slot in a width direction of the partition slot is no less than 4 mm.

12. An electronic device comprising a housing assembly, wherein the housing assembly comprises:

a housing main body, comprising a partition slot;

an antenna partition piece, connected to the housing main body and comprising a first partition portion filling the partition slot; and a reinforcing piece, connected to the antenna partition piece, wherein an angle is formed between an extension direction of the reinforcing piece and an extension direction of the partition slot, and a projection of the partition slot in a direction perpendicular to the extension direction of the reinforcing piece is at least partially located on the reinforcing piece;

wherein the antenna partition piece comprises a second partition portion and a third partition portion, and at least one of the second partition portion and the third partition portion is provided with the reinforcing piece;

wherein at least one of the second partition portion and the third partition portion comprises a recessed accommodating groove, and the reinforcing piece is at least partially located in the recessed accommodating groove;

wherein the reinforcing piece comprises a first connecting portion, and a first matching portion in matched connection with the first connecting portion is located in the recessed accommodating groove;

wherein the reinforcing piece comprises a first side face located on a same side as an opening of the recessed accommodating groove, and a second side face opposite to the first side face, the first connecting portion comprises a first groove arranged on the second side face, the first matching portion comprises a second protrusion matched with the first groove, and at least two of the first grooves are respectively located on two opposite sides of the partition slot in a width direction of the partition slot; and the reinforcing piece comprises a third side face and a fourth side face which are located between the first side face and the second side face and are opposite to each other, the first connecting portion comprises a third protrusion arranged on the third side face, the first matching portion comprises a fourth groove matched with the third protrusion, and at least two of the third protrusions are respectively located on two opposite sides of the partition slot in the width direction of the partition slot.

13. The electronic device according to claim 12, wherein the housing main body comprises a bottom plate and a side plate arranged around an edge of the bottom plate, wherein the side plate comprises a notch forming the partition slot, the bottom plate comprises a clearance area communicating with the partition slot, the second partition portion connected to the side plate and the first partition portion, and the third partition portion filling the clearance area.

14. The electronic device according to claim 12, wherein the second partition portion is tightly connected to an inner wall face of the side plate, the recessed accommodating groove is on an inner surface of the second partition portion facing away from the side plate, and a first side face of the reinforcing piece, which is located on a same side as an opening of the recessed accommodating groove, is recessed within or flush with the inner surface of the second partition portion.

15. The electronic device according to claim 12, wherein the partition slot comprises two opposite side wall faces in a width direction of the partition slot, at least one of the two opposite side wall faces has at least one fifth groove, the first partition portion comprises a sixth protrusion matched with the fifth groove.

16. The electronic device according to claim 12, wherein the housing main body comprises a bottom plate and a side plate arranged around an edge of the bottom plate, wherein the side plate comprises a notch forming the partition slot, the bottom plate comprises a clearance area communicating with the partition slot, the bottom plate is provided with at least one reinforcing rib, an angle is formed between an extension direction of the reinforcing rib and the extension direction of the partition slot, and a projection of the partition slot in a direction perpendicular to the extension direction of the reinforcing rib is at least partially located on the reinforcing rib.

* * * * *